June 28, 1966 M. FELCHECK ETAL 3,258,613

APPARATUS FOR SELECTIVELY SUPPLYING ELECTRICAL PULSES
OF DIFFERENT WIDTHS TO A PLURALITY OF LOAD DEVICES

Filed June 16, 1964

INVENTORS

MARVIN FELCHECK
NANJUNDIAH NARASIMHA MURTHY

BY Stewart F. Moore
ATTORNEY

United States Patent Office 3,258,613

Patented June 28, 1966

3,258,613

APPARATUS FOR SELECTIVELY SUPPLYING ELECTRICAL PULSES OF DIFFERENT WIDTHS TO A PLURALITY OF LOAD DEVICES

Marvin Felcheck, Bayside, N.Y., and Nanjundiah N. Murthy, Norwalk, Conn., assignors to American Machine & Foundry Company, a corporation of New Jersey Filed June 16, 1964, Ser. No. 375,465
10 Claims. (Cl. 307—88.5)

This invention relates to control systems for providing a pulse of predetermined width to a load, and more specifically to devices for providing pulses of several predetermined widths to several loads in accordance with the requirements of each load.

In the design of an electrical or electromechanical system, such as a computer or a servo system, it is frequently desirable to employ a number of electromagnetic relays in various forms as, for example, stepping switches, multiple contact relays, solenoids, and the like. For an automatic system, it is essential that these devices operate reliably which requires that each such device be provided with the proper amount of power, and, even more important, that the width of the driving waveform be tailored to meet the specific requirements of each load device. This requirement can easily be met by providing each device with a separate power amplifier designed to provide a pulse of predetermined width. This, although satisfactory, is expensive, and is wasteful as to the space and weight allocations which are so important in modern electrical equipment.

It is therefore an object of the present invention to provide a circuit which utilizes a single switching amplifier to selectively energize a plurality of load devices.

A further object is to provide a system in which a single switching amplifier supplies any one of a plurality of load devices with a pulse the width of which is tailored to best operate that particular device.

Yet another object is to provide a device in which a single controlled switching device is time-shared to supply a plurality of load devices sequentially.

The invention employs a controlled pulse width amplifier including a power transfer unit which is controlled by a relatively low power signal to provide a relatively high power energy pulse selectively to a number of load devices, the loads not necessarily being alike in electrical characteristics. A selective switching system is controlled by a second control input to choose one of the loads and a circuit operative to terminate the application of energy to the chosen load a predetermined time after initiation of the power pulse.

An alternative embodiment of the invention employs the basic system to sense non-electrical ambient variables, such as temperature, pressure, etc., and to transmit this information to a location physically removed from the sensing elements.

These and other objects of the invention can be understood by reference to the accompanying drawings, which form a part of this specification, and wherein.

Figures 1, 2, 3:
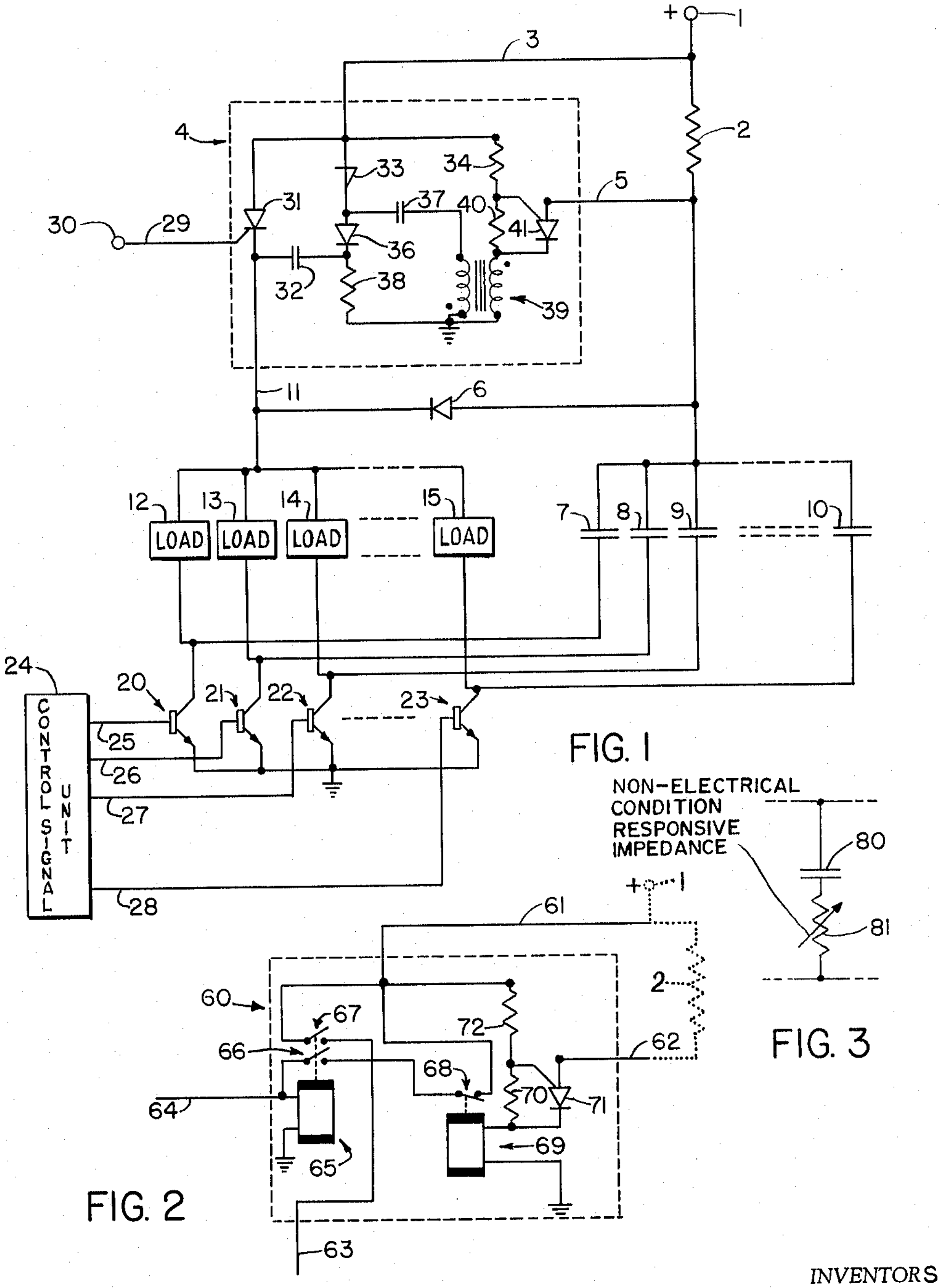
FIG. 1 is a schematic diagram showing one embodiment of the invention.
FIG. 2 is a schematic diagram of an alternate embodiment of the switching amplifier unit employed in the system of FIG. 1.
FIG. 3 illustrates an alternate application of the system of FIG. 1.

Referring now to the drawings, and first to FIG. 1 thereof, a positive D.C. supply terminal 1 is connected to one terminal of a resistance 2 and, by conductor 3, to a junction within a switching amplifier unit indicated generally at 4. The other terminal of resistance 2 is connected by conductor 5 to another junction within switching amplifier unit 4 which is connected to the anode of a silicon controlled switch (SCS) 41, to the anode of a semiconductor diode 6, and to one terminal of each of a plurality of capacitors indicated at 7, 8, 9 and 10. Although only four capacitors are illustrated in FIG. 1, it is to be understood that any number of capacitors may be used in the circuit, for reasons which will become evident below.

The cathode of semiconductor diode 6 is connected by conductor 11 to still another junction within switching amplifier unit 4, and also to one terminal of each of a plurality of electrical load devices 12, 13, 14 and 15. As in the case of capacitors 7–10, although only four electrical load devices are shown in FIG. 1, any number may be used. The other terminal of load device 12 is connected to the other terminal of capacitor 7, and also to the collector of an NPN transistor, indicated generally at 20. Similarly, the other terminals of load devices 13–15 are connected to the other terminals of capacitors 8–10, respectively, and also to the collectors of the transistors indicated generally at 21–23, respectively. Each of the emitters of transistors 20–23 is connected to ground. Each of the base electrodes of transistors 20–23 is connected by conductors 25–28, respectively, to points within control signal unit 24, the function of which will be described in detail below. The remaining input to switching unit 4 is connected by conductor 29 to a gate input terminal 30.

The operation of the system depends upon two inputs, one being a pulse applied to gate input terminal 30, and the other being conducted or generated by control signal unit 24. A function of the entire system, as briefly described above, is to provide a pulse of selectively predetermined width to any one of the load devices 12–15 selected as the function of control signal unit 24. The function of the signal applied to gate input terminal 30 via conductor 29 to switching unit 4 is to initiate the pulse of selected width which is supplied as a function of unit 4 to the selected load device.

Control signal unit 24 can be any of a number of conventional devices capable of supplying a positive potential to the base of one of the NPN transistors 20–23, the only requirements for this positive potential signal being that it is of sufficient magnitude to place the chosen transistor in its highly conductive state, and that this positive potential be maintained until termination of the pulse supplied to the load device. In its simplest form, control signal unit 24 can include a positive D.C. input line and a plurality of toggle switches each arranged to connect the positive supply line to one of conductors 25–28. In automatic equipment, it would be more desirable for unit 24 to include a plurality of electromagnetic relays or other remotely controlled devices, each capable of supplying the required positive potential in response to a command signal from a remote location.

Unit 24 may also include a signal generator capable of responding to a pulse of relatively short duration to produce a pulse of predetermined width greater than the widest pulse to be supplied to any of the load devices 12–15, that same short duration pulse then being applied, slightly delayed, to gate input terminal 30 to initiate the output pulse from switching unit 4. In this event, it would be necessary to provide other means to direct the generated output of unit 24 to one of the conductors 25–28, and thence to the base of one of the transistors 20–23. This means may, for example, be a simple selector switch.

Switching unit 4, in the prefered embodiment shown in FIG. 1, includes a conventional silicon controlled rectifier (SCR) 31 which is cathode connected by conductor 11 to the cathode of semiconductor diode 6, to one terminal of each of the electrical load devices 12–15, and to one terminal of a capacitance 32. The anode of SCR 31 is connected by conductor 3 to positive D.C. supply terminal 1, and is also connected to the anode of a Shockley four-layer diode 33, and to one terminal of a resistance 34. The cathode gate of SCR 31 is connected via conductor 29 to gate input terminal 30. Shockley diode 33 is cathode connected to the anode of semi-conductor diode 36 and to one terminal of a capacitance 37 while diode 36 is cathode connected to the other terminal of capacitance 32, and to one terminal of resistance 38 connected at its other terminal to ground. The other terminal of capacitance 37 is connected to one terminal of the secondary winding of a coupling transformer 39, the other terminal of that secondary being connected to ground. One terminal of the primary winding of transformer 39 is connected to ground, and the other terminal is connected to one terminal of a resistance 40 and to the cathode of a silicon controlled switch (SCS) 41. The anode gate electrode of SCS 41 is connected to the other terminals of resistances 34 and 40 which are series connected to form a voltage divider. The anode of SCS 41 is connected via conductor 5 to resistance 2.

For purposes of explanation, assume that control signal unit 24 has been commanded to provide a positive D.C. potential via conductor 25 to the base of transistor 20, thereby placing transistor 20 in its highly conductive, or "on" state, the impedance of transistor 20 therefore dropping to its lowest condition. A circuit will then exist from ground, through the emitter and collector circuits of transistor 20, electrical load device 12, diode 6, and resistance 2 to D.C. supply terminal 1. At this time, there being no pulse applied to gated terminal 30, SCR 31, Shockley diode 33, and SCS 41, are all in their nonconductive state and no load current flows from terminal 1 through switching unit 4 to one of the load devices 12 to 15. The impedance of resistance 2 is chosen to be significantly greater than the D.C. impedance of any of the electrical load devices 12–15, so that the greater part of the voltage across the circuit just described appears across resistance 2, the voltage at the anode of semiconductor diode 6 therefore being very close to ground potential. The connection of terminal 1 to series connected resistances 34 and 40 provides an internal bias. At this point in the sequence of operations, the selection system including unit 24 and transistors 20–23 has chosen the load which is to be energized, but insufficient current flow exists to cause that energization.

If a start pulse is now applied to gate input terminal 30, transmitted by conductor 29 to the cathode gate of SCR 31, SCR 31 will be placed in its high conduction state and will pass current through the circuit from D.C. supply terminal 1 via conductor 3 through SCR 31, via conductor 11 to load device 12 and transistor 20 to ground. SCR 31 is a conventional SCR, having the characteristic of substantially no impedance when in its conductive state. The current flow will then be determined primarily by the impedance of the load itself, and the voltage appearing across the load under these circumstances will aproximate the value of the positive D.C. supply. The voltage level at the cathode of diode 6 will increase to approximately supply voltage level as soon as conduction by SCR 31 commences, thereby blocking or back biasing diode 6 from further conduction. At this point, a charging circuit is established for one of the capacitors 7–10 through the circuit from D.C. supply terminal 1 through resistance 2, capacitor 7, and transistor 20 to ground.

It should be noted that the selection of load 12 for energization by placing transistor 20 in its conductive state also selected capacitor 7 as the one of capacitors 7–10 to be charged while load 12 is receiving the pulse from switching unit 4. If transistor 21 had been placed in its conductive state instead of transistor 20, load 13 and capacitor 8 would have been selected. Capacitor 7 will accumulate a charge in a period of time determined by the product of the values of resistance 2 and capacitor 7, the positive charge appearing at the upper plate of capacitor 7, as viewed in FIG. 1. As capacitor 7 charges, the voltage at the anode of diode 6 and the anode of SCS 41 will increase. The cathode of SCS 41 is at substantially ground potential, the primary winding of transformer 39 presenting substantially zero D.C. impedance. The operation of SCS 41 is such that, when its anode is made sufficiently more positive than the gate, it will begin to conduct current heavily, the current being limited only by external circuit impedances. Thus, when capacitor 7 charges to the critical breakdown voltage of SCS 41, SCS 41 will conduct, discharging capacitor 7 and providing a pulse of energy to the primary of transformer 39. The windings of transformer 39 are phased such that the pulse delivered as a positive pulse to the primary 39 will appear as a negative pulse at the top of the secondary winding of transformer 39, as viewed in FIG. 1, which is provided via capacitor 37 to the junction of the anode of diode 36 and the cathode of Shockley diode 33. The negative pulse causes diode 33 to go into its high conduction state and current is conducted through the circuit from positive D.C. supply terminal 1 via conductor 3 through Shockley diode 33 and diode 36, and through resistance 38 to ground. Such current flow drives the terminal of capacitor 32, connected between diode 36 and resistor 38, positive. Under these circumstances, because of the charge developed across capacitor 32, when SCR 31 commenced conducting, the cathode of SCR 31 is driven positive with respect to its anode causing SCR 31 to cease conduction sharply, terminating the pulse supplied to load device 12.

The sudden termination of power applied to load device 12 will permit the RC network formed by resistor 38 and capacitor 32, in some instances, to starve or cause the Shockley diode 33 to stop conducting. Should this fail to occur due to design of the RC network or for other causes, the Shockley diode 33 will continue to conduct until SCR 31 is fired by a gating pulse. At this time, a positive pulse is transmitted by capacitor 32 to reverse bias diode 33. Immediately following the discharge of capacitor 7 through SCS 41, the positive voltage at the anode of SCS 41 which initiated its conduction disappeared, thereby allowing SCS 41 to return to an inactive state. The values of resistors 34 and 40 are so selected that, until a voltage at the anode of SCS 41 reaches the critical voltage, no conduction occurs. SCR 31, Shockley diode 33 and SCS 41 are now in their inactive states, and are in condition for the initiation of another cycle. The positive potential applied to the base of transistor 20 by signal control unit 24 is now terminated, and another selection can be made. It should be noted again that the positive potential supplied by signal control unit 24 must remain until the pulse from switching unit 4 terminates, or the power pulse supplied to the selected one of load devices 12–15 will be abbreviated.

It will be seen that any number of load devices can be used with this circuit, it being only necessary to supply a capacitor and transistor similar to capacitors 7–10, and transistors 20–23, for each additional load device applied.

Although the particular embodiment of switching unit 4 illustrated in FIG. 1 is especially intended to be used with inductive loads, the invention is not limited to use with inductive loads and can be employed to great advantage with loads having other characteristics, it then being necessary only to modify switching unit 4. An alternate embodiment for the switching unit is illustrated in FIG. 2, in which the switching unit 60 has a conductor 61 corresponding to conductor 3 of FIG. 1. Thus, conductor 61 would be connected to the positive D.C. supply terminal 1 and to one terminal of resistance 2. Similarly, a conductor 62 of FIG. 2, corresponding to conductor 5, FIG. 1, would be connected to the other terminal of resistance 2, the anode of diode 6 and one terminal of all of capacitances 7–10, FIG. 1. Similarly, a conductor 63 of FIG. 2, the equivalent to conductor 11 of FIG. 1, is to be connected to the cathode of diode 6 and to one terminal of each of the load devices 12–15. A conductor 64, FIG. 2, is equivalent to conductor 29 of FIG. 1, the unattached end to be attached to gate input terminal 30.

Switching unit 60 includes an electromagnetic relay 65 having two terminals, one connected to ground and the other connected to conductor 64 and to one terminal of a normally open contact set 66. The other terminal of contact set 66 is connected to one terminal of a normally closed contact set 68, of an electromagnetic relay 69. The other terminal of contact set 68 is connected through conductor 61 to the positive D.C. supply terminal. The winding of relay 69 has two terminals, one connected to ground and the other connected to one terminal of a resistance 70 (corresponding to resistance 40, FIG. 1) and to the cathode of a silicon controlled switch (SCS) 71 (corresponding to SCS 41, of FIG. 1). The other terminal of resistance 70 is connected to one terminal of a resistance 72 (corresponding to resistance 34, FIG. 1), and to the anode gate connection of SCS 71. The anode of SCS 71 is connected to conductor 62 and also to one terminal of resistance 2. The other terminal of resistance 2 is connected to terminal 1, and by conductor 61 to the other terminal of resistance 72 and one contact of a normally open contact set 67, of electromagnetic relay 65.

The operation of switching unit 60 (assuming for the moment that unit 60 is substituted for unit 4 in FIG. 1 with conductor 64 connected in place of conductor 29, conductor 61 in place of conductor 3, conductor 62 in place of conductor 5, and conductor 63 in place of conductor 11) will commence by a positive pulse applied to gate input terminal 30, passing via conductor 64 to one terminal of the winding relay 65 designed to be energized thereby and close normally open contact sets 66 and 67. A circuit is thus completed from ground through the coil of electromagnetic relay 65, through contact set 66 of relay 65, contact set 68 of relay 69, and thence via conductor 61 to the positive D.C. supply terminal. This circuit acts as a latching circuit to hold relay 65 energized beyond the duration of the relatively short-lived pulse applied to gate input terminal 30.

A circuit is also completed from the positive D.C. supply terminal 1 via conductor 61 through contact set 67 of relay 65 and via conductor 63 to one of the electrical load devices 12–15, and thence through the appropriate diode and transistor to ground. As previously described, one of the capacitors 7–10 will then commence to charge through resistance 2 and the appropriate one of transistors 20–23. The voltage level produced by this rising charge will appear at the anode of SCS 71, and, when the critical voltage of SCS 71 is reached, will cause heavy current flow through the circuit from the positive D.C. terminal 1 via conductor 61, through resistance 72, SCS 71, the coil of electromagnetic relay 69, and to ground. Relay 69 so energized, will open the normally closed contact set 68 to de-energize relay 65 which, in turn will open the two normally open contact sets 66 and 67, terminating the pulse applied to the selected one of electrical load devices 12–15 and opening the holding circuit for relay 65 in preparation for another input pulse. Energization of relay 69 is momentary only, but it is sufficient to allow relay 65 to de-energize. The values of resistances 70, and 72 are so chosen that relay 69 will not be energized until SCS 71 is rendered conductive which will be only when the selected one of capacitors 7–10 is charged to supply the critical voltage to the SCS anode.

It is to be noted that the switching unit described and shown in FIG. 2 does not depend on the presence of an inductive load for operation, but can be used with any selected load device.

Referring now to FIG. 3, the invention can be applied with relatively slight modification to provide a remote indication of non-electrical variable conditions, for example, temperature, humidity, pressure, or the like. In FIG. 3, a capacitor 80 is shown connected in series circuit relationship with a variable impedance 81 between two conductors. Variable impedance 81 can be any of a number of conventional transducers capable of responding to a non-electrical variable condition such as those just mentioned. A plurality of the circuits shown in FIG. 3 can be advantageously substituted each for a different one of the capacitors 7–10 in FIG. 1, and each of the variable impedances 81 so employed can be responsive to a different ambient condition. It will then be seen that the width of the pulse to be supplied to one of the loads 12–15 will be modified in direct proportion to the impedance of the corresponding element 81, and therefore in proportion to the non-electrical condition being detected by the element 81.

Assume that the series circuit of FIG. 3 is substituted for the capacitor 7 of FIG. 1, and that impedance 81 is a positive temperature coefficient resistance which increases with an increase in temperature. Assume further that the entire unit as shown in FIG. 1, except control signal unit 24, is installed at a remote location at which it is difficult or inconvenient to measure temperature and that at a more convenient location, is a control panel including control signal unit 24, a signal generator connected to gate input terminal 30, and a pair of conductors leading to a set of normally open relay contacts of a relay within electrical load device 12. To read the temperature at the remote location, it is then necessary only to provide a positive potential to conductor 25 by proper manipulation of control signal unit 24, and a positive pulse to gate input terminal 30. A pulse will then be propagated through the relay of load device 12, the width of which will be indicative of the temperature at the remote location. The conductors leading from the normally open set of contacts of the relay in the electrical load device 12 could be connected to a slow-trace oscilloscope or a pen-chart oscillograph at the control station, giving a readily observable, and, if desired, permanent record of the temperature at the remote location. After initial calibration, temperature readings could be taken at will, or, with the aid of suitable timing means, at automatically controlled periodic intervals.

While certain advantageous embodiments have been chosen to illustrate the invention, it will be understood by those skilled in the art that various changes and modifications can be made therein without departing from the scope of the invention as defined in the appended claims.

What is claimed is:

1. In apparatus for selectively providing electrical pulses of predetermined durations to a plurality of electrical load devices, the combination of a plurality of load circuit portions each having a first terminal and a second terminal, said first terminals being connected to a common junction;

relay circuit means having an input terminal adapted to receive electrical power and an output terminal connected to said common junction for providing pulses of electrical power to said load circuit portions, said relay circuit means having a first control terminal adapted to receive successive start pulses, and a second control terminal to receive successive stop pulses, the pulses of electrical power provided by said relay circuit means each being initiated by a start pulse received by said first control terminal and terminated by a stop pulse received by said second control terminal;

a plurality of capacitive circuit units;

switching circuit means operatively connected to select said load circuit portions one at a time and, with each such selection, to select a corresponding one of said capacitive circuit units;

charging circuit means including said switching circuit means and operatively connected to charge each selected capacitive circuit unit to a predetermined voltage level in a predetermined period of time;

pulsing circuit means connected to said charging circuit means and said second terminal to supply a stop pulse to such second terminal when the selected one of said capacitive circuit units has been charged to its predetermined voltage level; and means for preventing said capacitive circuit units from accumulating any material charge until a start pulse is received by said first control terminal of said relay circuit means.

2. Apparatus in accordance with claim 1 and wherein said relay circuit means comprises an asymmetrically conductive semiconductor device having an anode connected to said input terminal, a cathode connected to said output terminal and a gate connected to said first control terminal, said semiconductor device being rendered conductive when said gate is supplied with a positive start pulse and remains conductive as long as said anode is at a higher positive potential than said cathode.

3. Apparatus in accordance with claim 1 and wherein said switching circuit means comprises a plurality of semiconductor devices each connected to a different one of said load circuit portions and a different one of said capacitive circuit units, each of said semiconductor devices including a control electrode and being operative to conduct current when its control electrode is provided with a positive D.C. voltage; and means connected to said semiconductor devices for selectively supplying a positive D.C. voltage to said semiconductor device control electrodes.

4. In apparatus for selectively providing electrical pulses of predetermined widths to a plurality of load devices, the combination of relay circuit means having an input terminal, an output terminal, a first control terminal, and a second control terminal;

voltage supply circuit means connected to said input terminal;

a plurality of load circuit portions each connected to said output terminal of said relay circuit means;

a plurality of semiconductor devices each having a control electrode, said semiconductor devices each being connected in series with a different one of said load circuit portions and each being operative, when conductive, to allow current flow from said relay circuit means through the associated one of said load circuit portions;

control means connected to the control electrodes of said semiconductor devices and operative to selectively render said semiconductor devices conductive to selectively activate said load circuit portions;

a plurailty of capacitive circuit units each connected to a different one of said semiconductor devices;

charging circuit means interconnecting said voltage supply circuit means and all of said capacitive circuit units; and pulsing circuit means having an input terminal and an output terminal, said input terminal of said pulsing circuit means being connected to a point between said charging circuit means and said capacitive circuit units, said output terminal of said pulsing circuit means being connected to said second control terminal of said relay circuit means.

5. In apparatus for selectively supplying electrical pulses of predetermined different durations to the individual ones of a plurality of load devices, the combination of circuit means having a first control terminal, a second control terminal, and an output terminal, said circuit means being operative to provide at said output terminal an electrical pulse of a duration dependent upon the time between application of a start pulse to said first control terminal and application of a stop pulse to said second control terminal;

a plurality of load circuit portions each connected to said output terminal;

selector means operative to select said load circuit portions individually for energization by a pulse provided at said output terminal;

a plurality of capacitive circuit units;

charging circuit means operative in conjunction with said selector means for completing a charging circuit for a predetermined one of said capacitive circuit units upon selection of one of said load circuit portions by said selector means;

means for preventing operation of said charging circuit means until a start pulse is applied to said first control terminal; and means responsive to charging of any selected one of said capacitive circuit units to a predetermined voltage level for supplying a stop pulse to said second control terminal.

6. Apparatus in accordance with claim 5 and wherein said charging circuit means includes a plurality of variable impedances each responsive to a non-electric condition and each connected in series with a different one of said capacitor units.

7. In apparatus for selectively supplying electrical pulses of different durations to the individual ones of a plurality of load devices, the combination of a pulse supply circuit having an output terminal and a control terminal and being operative to supply to said output terminal electrical pulses each of a duration depending upon application of a stop pulse to said control terminal;

a plurality of load circuit portions all being connected to said output terminal;

selector means operatively connected to said load circuit portions to selectively complete said load circuit portions for energization by pulses supplied at said output terminal;

a plurality of timing units each operative to supply a stop pulse to said control terminal at a time delay, after commencement of energization of a selected one of said load circuit portions, determined by the said selected one of said load circuit portions; and means operating in conjunction with said selector means for selectively activating one of said timing units in accordance with selective completion of one of said load circuit portions by said selector means.

8. In apparatus for selectively supplying electrical pulses of predetermined different durations to the individual ones of a plurality of load devices, the combination of a pulse supply circuit having an input terminal adapted to receive electrical power, a first control terminal adapted to receive successive start pulses, a second control terminal to receive successive stop pulses, and an output terminal, said pulse supply circuit being operative to supply to said output terminal successive pulses of electrical power each of a duration determined by the time between a start pulse received by said first control terminal and a stop pulse received by said second control terminal;

a plurality of transistors each having an emitter connected in common-emitter circuit configuration, a collector and a base;

a plurality of load circuit portions each circuit portion being connected between said output terminal of said pulse supply circuit and the collector of a different one of said transistors;

selector means connected to the bases of said transistors and operative to selectively activate said load circuit portions by selectively rendering said transistors conductive;

a plurality of capacitors each having one terminal connected to the collector of a different one of said transistors and another terminal connected to a common junction;

means for connecting said common junction to a source of positive D.C. potential for charging of said capacitors selectively in accordance with the one of said transistors rendered conductive;

means connecting said common junction to said second control terminal of said pulse supply circuit to provide a stop pulse to said second control terminal when said selected one of said capacitors is charged; and a circuit portion connected between said common junction and said output terminal of said pulse supply circuit and including an asymmetrically conductive device to prevent charging of any of said capacitors during the time between each stop pulse applied to said second control terminal and the next occurring start pulse applied to said first control terminal.

9. Apparatus in accordance with claim 8 and further comprising a plurality of variable impedances each responsive to a non-electric condition and each connected in series with a different one of said capacitors.

10. Apparatus in accordance with claim 7 and further comprising a plurality of variable impedances each responsive to a non-electric condition and each connected in series with a different one of said timing units.

No references cited.

ARTHUR GAUSS, *Primary Examiner*.

J. ZAZWORSKY, *Assistant Examiner*.